US008675502B2

(12) United States Patent
Blair (10) Patent No.: US 8,675,502 B2
(45) Date of Patent: Mar. 18, 2014

(54) RELATIVE ONE-WAY DELAY MEASUREMENTS OVER MULTIPLE PATHS BETWEEN DEVICES

(75) Inventor: Dana Lynn Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 745 days.

(21) Appl. No.: 12/022,998

(22) Filed: Jan. 30, 2008

(65) Prior Publication Data
US 2009/0190482 A1 Jul. 30, 2009

(51) Int. Cl.
*H04J 1/16* (2006.01)
(52) U.S. Cl.
USPC .......................................... 370/248; 370/389
(58) Field of Classification Search
USPC .............. 370/235, 241, 241.1, 248, 249, 250, 370/252, 389, 400
See application file for complete search history.

(56) References Cited

U.S. PATENT DOCUMENTS

| 4,569,042 | A | 2/1986 | Larson |
| 5,926,461 | A | 7/1999 | Habermann et al. |
| 6,012,096 | A | 1/2000 | Link et al. |
| 6,697,382 | B1 | 2/2004 | Eatherton |
| 6,807,156 | B1 | 10/2004 | Veres et al. |
| 6,868,094 | B1 | 3/2005 | Bordonaro et al. |
| 6,976,087 | B1 | 12/2005 | Westfall et al. |
| 7,035,210 | B2 | 4/2006 | Walles |
| 7,111,073 | B1 | 9/2006 | Jain et al. |
| 7,137,035 | B2 * | 11/2006 | Sato et al. ...................... 714/25 |
| 7,519,006 | B1 * | 4/2009 | Wing ............................. 370/252 |
| 7,568,045 | B1 * | 7/2009 | Agrawal ....................... 709/233 |
| 7,619,982 | B2 * | 11/2009 | Blair et al. .................... 370/248 |
| 7,675,861 | B2 | 3/2010 | Metzger et al. |
| 2005/0185587 | A1 * | 8/2005 | Klinker ......................... 370/237 |
| 2006/0034188 | A1 | 2/2006 | Oran et al. |
| 2006/0239199 | A1 * | 10/2006 | Blair et al. ................... 370/248 |
| 2006/0239201 | A1 | 10/2006 | Metzger et al. |
| 2009/0122805 | A1 * | 5/2009 | Epps et al. ................... 370/417 |

OTHER PUBLICATIONS

Lai et al., "A Framework for Internet Traffic Engineering Measurement," IETF Draft draft-ietf-tewg-measure-00.txt,ietf.rog, Aug. 2001, 18 pages.
Paul Barford & Joel Sommers, "A Comparison of Probe-based and Router-based Methods for Measuring Packet Loss," UW Technical Report, Sep. 2003, 14 pages.
Kostas G. Anagnostakis & Michael Greenwald, "cing: Measuring Network-Internal Delays using only Existing Infrastructure," IEEE INFOCOM 2003, 10 pages.

(Continued)

*Primary Examiner* — Yemane Mesfin
*Assistant Examiner* — Mon Cheri Davenport
(74) *Attorney, Agent, or Firm* — The Law Office of Kirk D. Williams (57) ABSTRACT

The relative one-way delays from a networked device to a remote device can be determined based on the round-trip delay of pairs of probe/probe-return packets as each pair takes a different path to the remote device and takes the same path from the remote device to the networked device. The relative one-way delays from a remote device to a networked device can be determined based on the round-trip delay of pairs of probe/probe-return packets as each pair takes a same path to the remote device and takes a different path from the remote device to the networked device.

10 Claims, 9 Drawing Sheets

(56) References Cited

OTHER PUBLICATIONS

N.G. Duffield & M Grossglauser, "Trajectory Sampling for Direct Traffic Observation," Networking, IEEE/ACM Transactions on, vol. 9, Issue 3, Jun. 2001, (14 pages).

"Cisco IOS IP Service Level Agreements," Data Sheet, Cisco Systems, Inc., San Jose, CA, Feb. 2006, 5 pages.

U.S. Appl. No. 11/985,239, filed Nov. 14, 2007, Epps et al.

U.S. Appl. No. 10/797,520, filed Mar. 9, 2004, Daniel Wing.

U.S. Appl. No. 09/823,429, filed Mar. 30, 2001, Iqbal Husain.

\* cited by examiner

FIGURE 6

RELATIVE ONE-WAY DELAY MEASUREMENTS OVER MULTIPLE PATHS BETWEEN DEVICES

TECHNICAL FIELD

The present disclosure relates generally to communications and computer systems, especially packet switching systems and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. It is common for networks and/or devices at different locations to be interconnected using via one or more paths through another network, such as a provider's backbone network. It is often desirable to determine the delay of packet traffic from one device to another device. However, current systems that determine one-way delay require a synchronization of the time-of-day clocks on each of the networked devices, so this delay can be accurately measured. Note, nothing described or referenced in this document is admitted as prior art to this application unless explicitly so stated.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-readable storage media, mechanisms, and means for measuring relative one-way delay measurements over multiple paths between devices.

One embodiment includes an apparatus, comprising: one or more network interfaces for coupling with one or more networks for communicating packets with a remote device; and a one-way path delay measurer configured to cause a plurality of probe packets to be sent from said one or more network interfaces to the remote device such that a corresponding plurality of return packets are received by the apparatus; wherein the plurality of probe packets are configured by the apparatus to cause: (a) each of the plurality of probe packets to traverse a same path from the apparatus to the remote device through said one or more networks and each of the corresponding plurality of return packets traverse a different path through said one or more networks, or (b) each of the plurality of probe packets to traverse a different path from the apparatus to the remote device through said one or more networks and each of the corresponding plurality of return packets traverse a same path through said one or more networks; wherein the one-way path delay measurer is configured to determine the relative one-way path measurements from the apparatus to the remote device or from the remote device to the apparatus based on the round-trip times of said probe packets sent to the remote device and their corresponding return packets. By configuring the probe packets appropriately, such as by selecting their source and destination addresses, load balancing values, and/or other values, the probe/corresponding return packet pairs will traverse a same path in one direction and different paths in one direction between the apparatus (e.g., one or more networked devices) and a remote device. Therefore, the relative round trip delays can be attributed to the different one-way paths taken, as it is assumed the time for traversing a same path by the different packets is approximately the same.

2. Description

Disclosed are, inter alia, methods, apparatus, computer-readable storage media, mechanisms, and means for measuring relative one-way delay measurements over multiple paths between devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable storage media, mechanisms, and means for measuring relative one-way delay measurements over multiple paths between devices.

One embodiment includes an apparatus, comprising: one or more network interfaces for coupling with one or more networks for communicating packets with a remote device; and a one-way path delay measurer configured to cause a plurality of probe packets to be sent from said one or more network interfaces to the remote device such that a corresponding plurality of return packets are received by the apparatus; wherein the plurality of probe packets are configured by the apparatus to cause: (a) each of the plurality of probe packets to traverse a same path from the apparatus to the remote device through said one or more networks and each of the corresponding plurality of return packets traverse a different path through said one or more networks, or (b) each of the plurality of probe packets to traverse a different path from the apparatus to the remote device through said one or more networks and each of the corresponding plurality of return packets traverse a same path through said one or more networks; wherein the one-way path delay measurer is configured to determine the relative one-way path measurements from the apparatus to the remote device or from the remote device to the apparatus based on the round-trip times of said probe packets sent to the remote device and their corresponding return packets. By configuring the probe packets appropriately, such as by selecting their source and destination network addresses (e.g., Internet Protocol (IP) addresses in an IP routed network, Multiprotocol Label Switching (MPLS) labels in an MPLS network, IEEE 802.3/Ethernet addresses in a bridged network, etc.), load balancing values, and/or other values, the probe/corresponding return packet pairs will traverse a same path in one direction and different paths in one direction between the apparatus (e.g., one or more networked devices) and a remote device. Therefore, the relative round trip delays can be attributed to the different one-way paths taken, as it is assumed the time for traversing a same path by the different packets is approximately the same.

In one embodiment, said configuration of said probe packets includes a selection of the source and destination addresses of said probe packets to said cause: (a) each of the plurality of probe packets to traverse a same path from the apparatus to the remote device through said one or more networks and each of the corresponding plurality of return packets traverse a different path through said one or more networks, or (b) each of the plurality of probe packets to traverse a different path from the apparatus to the remote device through said one or more networks and each of the corresponding plurality of return packets traverse a same path through said one or more networks. In one embodiment, the apparatus is a single networked device.

One embodiment includes an apparatus, comprising: a plurality of network interfaces for coupling with one or more networks for communicating packets with a remote device having a particular network address; and a one-way path delay measurer configured to cause a probe packet to be sent from each of the plurality of network interfaces, with each of said probe packets having a header comprising a source network address and a destination network address, wherein the source network address of each said probe packet is a same specific network address, and wherein the destination network address of each said probe packet is the particular network address; wherein the one-way path delay measurer is configured to determine the relative one-way path measurements from the apparatus to the remote device corresponding to the plurality of network interfaces based on the round-trip times of said probe packets sent to the remote device and their corresponding return packets received on a particular interface of the plurality of network interfaces corresponding to said specific network address.

In one embodiment, the apparatus is configured: to select an egress interface of the plurality of network interfaces based on said determined relative one-way path measurements, and in response, using the egress interface to send a plurality of additional packets towards the remote device. In one embodiment, the particular network address is an Internet Protocol (IP) address. In one embodiment, each of said probe packets is an Internet Control Message Protocol (ICMP) echo request, and each of said return packets is an ICMP echo reply; or wherein each of said probe packets is a Transmission Control Protocol (TCP) SYN (synchronize start) packet, and each of said return packets is a TCP SYN ACK (synchronize acknowledge) or TCP RST (reset) packet. In one embodiment, wherein each of the plurality of network interfaces is assigned a different network address; and wherein the one-way path delay measurer is configured to cause a plurality of ingress measurement probe packets to be sent from one of the plurality of network interfaces, with each of said ingress measurement probe packets having a header comprising an source network address and a destination network address, wherein the source network address of each said ingress measurement probe packet is a different one of the network addresses of the plurality of network interfaces, and wherein the destination network address of each said ingress measurement probe packet is the particular network address; wherein the one-way path delay measurer is configured to determine the relative one-way path measurements from the remote device to the apparatus corresponding to the plurality of network interfaces based on the round-trip times of said ingress measurement probe packets sent to the remote device and their corresponding return packets received on the plurality of network interfaces. In one embodiment, the particular network address is an Internet Protocol (IP) address.

One embodiment includes an apparatus, comprising: a plurality of network interfaces for coupling with one or more networks for communicating packets with a remote device having a particular network address, with each of the plurality of network interfaces having a different network address; and a one-way path delay measurer configured to cause a plurality of probe packets to be sent from one of the plurality of network interfaces, with each of said probe packets having a header comprising an source network address and a destination network address, wherein the source network address of each said probe packet is a different one of the network addresses of the plurality of network interfaces, and wherein the destination network address of each said probe packet is the particular network address; wherein the one-way path delay measurer is configured to determine the relative one-way path measurements from the remote device to the apparatus corresponding to the plurality of network interfaces based on the round-trip times of said probe packets sent to the remote device and their corresponding return packets received on the plurality of network interfaces. In one embodiment, the particular network address is an Internet Protocol (IP) address.

One embodiment is configured to perform operations, including: sending a probe packet from each of a plurality of network interfaces of a networked device for transportation across one or more networks to a remote device having a particular network address, each of said sent probe packets having a header comprising an source network address and a destination network address, wherein the source network address of each said sent probe packet is a same specific network address, and wherein the destination network address of each said sent probe packet is the particular network address; receiving, on a particular interface of the plurality of network interfaces corresponding to the specific network address, a plurality of return packets corresponding to said sent probe packets; and determining the relative one-way path measurements from the networked device to the remote device corresponding to the plurality of network interfaces based on the round-trip times of said sent probe packets and their corresponding received return packets.

One embodiment includes: selecting an egress interface of the plurality of network interfaces based on said determined relative one-way path measurements, and in response, using the egress interface to send a plurality of additional packets towards the remote device. In one embodiment, the particular network address is an Internet Protocol (IP) address. In one embodiment, each of the plurality of network interfaces is assigned a different IP address for use as the source IP address of packets sent from it. One embodiment includes advertising the specific IP address from the particular interface, and not advertising the specific IP address from the other interfaces of the plurality of network interfaces. In one embodiment, each of the network interfaces leads to a different next packet switching device in said one or more networks on a path to the remote device. One embodiment includes determining the relative one-way path measurements from the remote device to each of the plurality of network interfaces.

In one embodiment, the particular network address is an Internet Protocol (IP) address; and wherein said determining the relative one-way path measurements from the remote device to each of the plurality of network interfaces includes: sending a plurality of ingress measurement probe packets out a network interface of the plurality of network interfaces for transportation across said one or more networks to the remote device, wherein each of the plurality of network interfaces has a different IP address, and each of said sent ingress measurement probe packets includes a header comprising an source IP address and a destination IP address, wherein the source IP address of each said sent ingress measurement probe packet is a different one of the IP addresses of the plurality of network interfaces, and wherein the destination IP address of each said sent ingress measurement probe packet is the particular IP address; receiving on each particular interface of the plurality of network interfaces a return ingress measurement packet corresponding to said sent ingress measurement probe packet with the IP address of said particular interface; and determining the relative one-way path measurements from the remote device to the networked device corresponding to the plurality of network interfaces based on the round-trip times of said sent ingress measurement probe packets and their corresponding received return ingress measurement packet. One embodiment includes selecting one of the plurality of network interfaces based on said determined relative one-way path measurements from the remote device to the networked device, and in response, advertising the IP address of said selected interface for reaching the networked device from the remote device.

One embodiment is configured to perform operations, including: sending a plurality of probe packets out a network interface of a plurality of network interfaces of a networked device for transportation across one or more networks to a remote device having a particular Internet Protocol (IP) address, each of the plurality of network interfaces having a different IP address, each of said sent probe packets having a header comprising an source IP address and a destination IP address, wherein the source IP address of each said sent probe packet is a different one of the IP addresses of the plurality of network interfaces, and wherein the destination IP address of each said sent probe packet is the particular IP address; receiving on each particular interface of the plurality of network interfaces a return packet corresponding to said sent probe packet with the IP address of said particular interface; and determining the relative one-way path measurements from the remote device to the networked device corresponding to the plurality of network interfaces based on the round-trip times of said sent probe packets and their corresponding received return packets.

In one embodiment, the particular network address is an Internet Protocol (IP) address. One embodiment includes selecting one of the plurality of network interfaces based on said determined relative one-way path measurements from the remote device to the networked device, and in response, advertising the IP address of said selected interface for reaching the networked device from the remote device. In one embodiment, each of the network interfaces leads to a different next packet switching device in said one or more networks on a path to the remote device.

One embodiment includes a first networked device and a second networked device, with the first networked device including one-way path delay measurer. In one embodiment, the one-way path delay measurer is configured to determine the relative round-trip delays across different networks from the first networked devices to a remote device, with one or more of the paths to the remote device traversing the second networked device. In one embodiment, the one-way path delay measurer is configured to determine the relative round-trip delays across different networks from a remote device the first networked device, with one or more of the paths from the remote device traversing the second networked device.

In one embodiment, the first networked device includes one or more first network interfaces of a plurality of network interfaces for coupling with one or more networks of a plurality of networks for communicating packets with a remote device having a particular Internet Protocol (IP) address; and the second networked device includes one or more second network interfaces of the plurality of network interfaces for coupling with one or more networks of the plurality of networks. In one embodiment, the one-way path delay measurer is configured to cause a probe packet to be sent from each of the plurality of network interfaces, with each of said probe packets having a header comprising an source IP address and a destination IP address, wherein the source IP address of each said probe packet is a same specific IP address, and wherein the destination IP address of each said probe packet is the particular IP address; wherein the one-way path delay measurer is configured to determine the relative one-way path measurements from the first network device to the remote device corresponding to the plurality of network interfaces based on the round-trip times of said probe packets sent to the remote device and their corresponding return packets received on a particular interface of the plurality of network interfaces corresponding to said specific IP address with said return packets received on said one or more second network interfaces being forwarded to the first networked device.

In one embodiment, the apparatus is configured: to select an egress interface of the plurality of network interfaces based on said determined relative one-way path measurements, and in response, using the egress interface to send a plurality of additional packets towards the remote device.

In one embodiment, the one-way path delay measurer is configured to determine the relative one-way delays from the remote device to the first networked device over the plurality of network interfaces.

In one embodiment, the one-way path delay measurer configured to cause a second plurality of probe packets to be sent from one of the plurality of network interfaces, with each of said second plurality of probe packets having a header comprising an source IP address and a destination IP address, wherein the source IP address of each of the second plurality of probe packets is a different one of the IP addresses of the plurality of network interfaces, and wherein the destination IP address of each of the second plurality of probe packets is the particular IP address; wherein the one-way path delay measurer is configured to determine the relative one-way path measurements from the remote device to the first networked device based on the round-trip times of the second plurality of probe packets sent to the remote device and their corresponding return packets received on the plurality of network interfaces with said return packets corresponding to the second plurality of probe packets received on said one or more second network interfaces being forwarded to the first Note, the explanations and figures disclosed herein typically illustrate one embodiment in the context of an IP routed network, and therefore, refer to IP addresses and IP networks. The teachings presented herein are also applicable to an extensible number and types of packet switched networks, such as, but not limited to IP routed networks, Multiprotocol Label Switching (MPLS) networks, bridged networks, Asynchronous Transfer Mode (ATM) networks, Frame Relay networks, etc. A commonality of various embodiments typically is that multiple probe packet/probe return packet pairings traverse a network in one direction over a same path and in over multiple different paths in the other direction, so a relative one-way delay determination can be made based on their respective round-trip times. In one embodiment, these different one-way traversals through the network are accomplished such as by, but not limited by, manipulating the source and destination network addresses (e.g., IP addresses in an IP routed network, IEEE 802.11/Ethernet addresses in a bridged network, MPLS labels in an MPLS network, etc.), load balancing, and/or other values of the probe packets.

Figure 1:
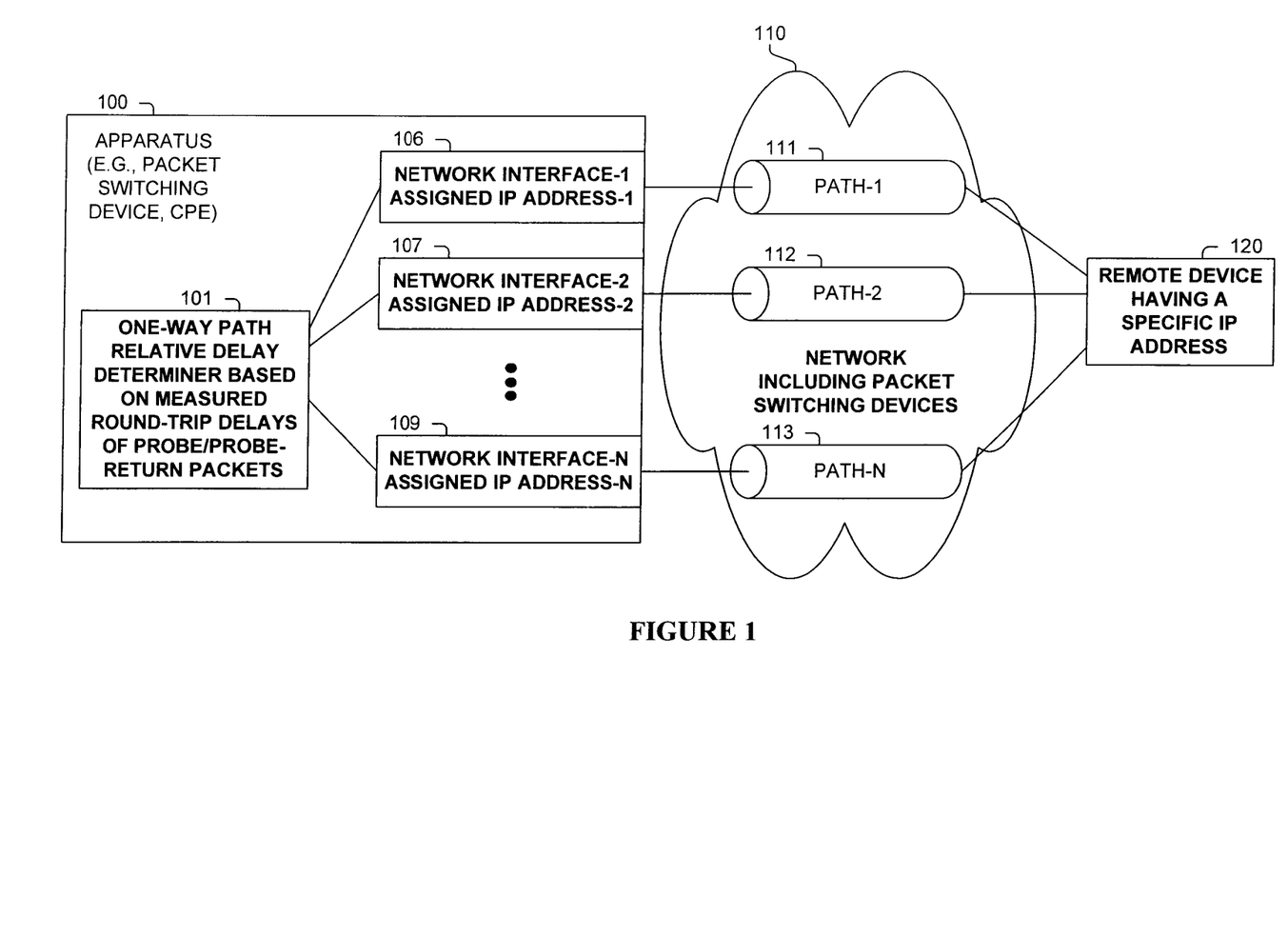
FIG. 1 illustrates an example configuration operating according to one embodiment.

Turning expressly to the figures, FIG. 1 illustrates a configuration operating according to one embodiment for determining the relative one-way delays between networked apparatus/device 100 and remote device 120.

As shown, apparatus 100 includes relative one-way delay determiner 101 (e.g., a process, specialized logic), which determines these relative one-way delays based on measured round-trip times of probe packet/probe return packet pairs sent and/or received on network interfaces 106-109, each having a different assigned IP address. Apparatus 100 is connected to remote device 120, which has a specific IP address assigned to one of its network interfaces, via network 110. As depicted, network 110 provides multiple physical and/or logical paths 111-113 through network 110 between apparatus 100 and remote device 120. These paths are known to the device via conventional methods, such as static configurations, and networking protocols which discover the network topology. In one embodiment, each of paths 111-113 have a different next hop packet switching device communicatively coupled to apparatus 100. Examples of each of paths 111-113 correspond to, but are not limited to, a different physical path through network 110, a different MPLS cloud, a different virtual private network, etc.

Note, the plural of "apparatus" is "apparatus." In one embodiment, apparatus 100 refers to a single networked device (e.g., a router or other packet switching device). In one embodiment, apparatus 100 refers to multiple networked device, with each of these networked devices including a different one or more of network interfaces 106-109; with one of these networked devices including relative one-way delay determiner 101.

Also note, that the IP probe packets and the corresponding IP probe return packets used in one embodiment can take one or more of an extensible number of forms and/or protocol types, which may include, but are not limited to: Internet Control Message Protocol (ICMP) echo requests/replies, Transmission Control Protocol (TCP) SYN (synchronize start) packets/TCP SYN ACK (synchronize acknowledge) or TCP RST (reset) packets, Stream Control Transmission Protocol (SCTP) packets, and/or other publicly available and/or proprietary probe/probe return packets.

Figure 2:
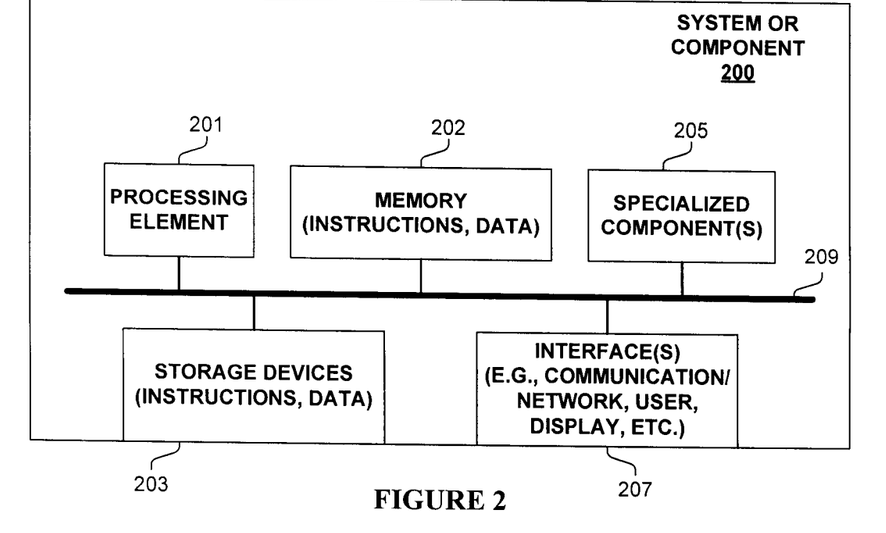
FIG. 2 illustrates an example system or component used in one embodiment.

FIG. 2 is block diagram of a system or component 200 used in one embodiment, such as part of a networked device or a remote device. In one embodiment, system or component 200 performs one or more processes corresponding to one of the flow diagrams illustrated or otherwise described herein.

In one embodiment, system or component 200 includes a processing element 201, memory 202, storage devices 203, specialized components 205 (e.g. optimized hardware such as for performing classification operations, etc.), and interface (s) 207 for communicating information (e.g., sending and receiving packets, user-interfaces, displaying information, etc.), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3:
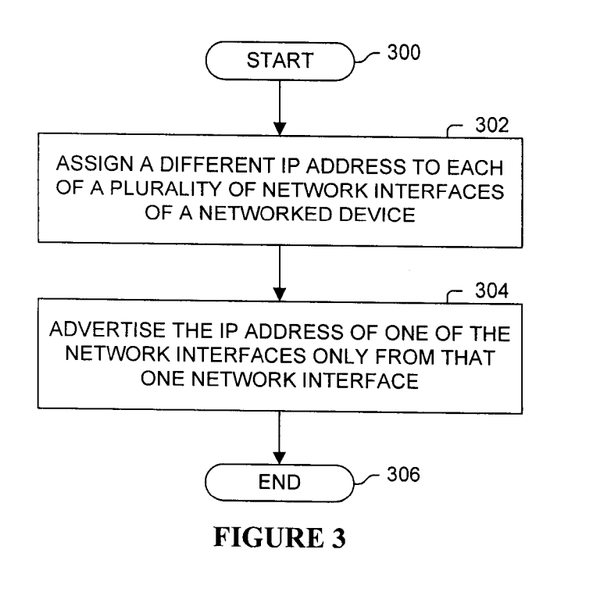
FIG. 3 illustrates a process used in one embodiment.

FIG. 3 illustrates an initialization process used in one embodiment. Processing begins with process block 300. In process block 302, a different IP address is assigned to each of the interfaces of a networked device. In process block 304, the IP address of one of the interfaces is only advertised from that interface (e.g., by a routing protocol). In this manner, probe return packets will be forced to follow a same path to that interface. Processing of the flow diagram of FIG. 3 is complete as indicated by process block 306.

Figure 4A:
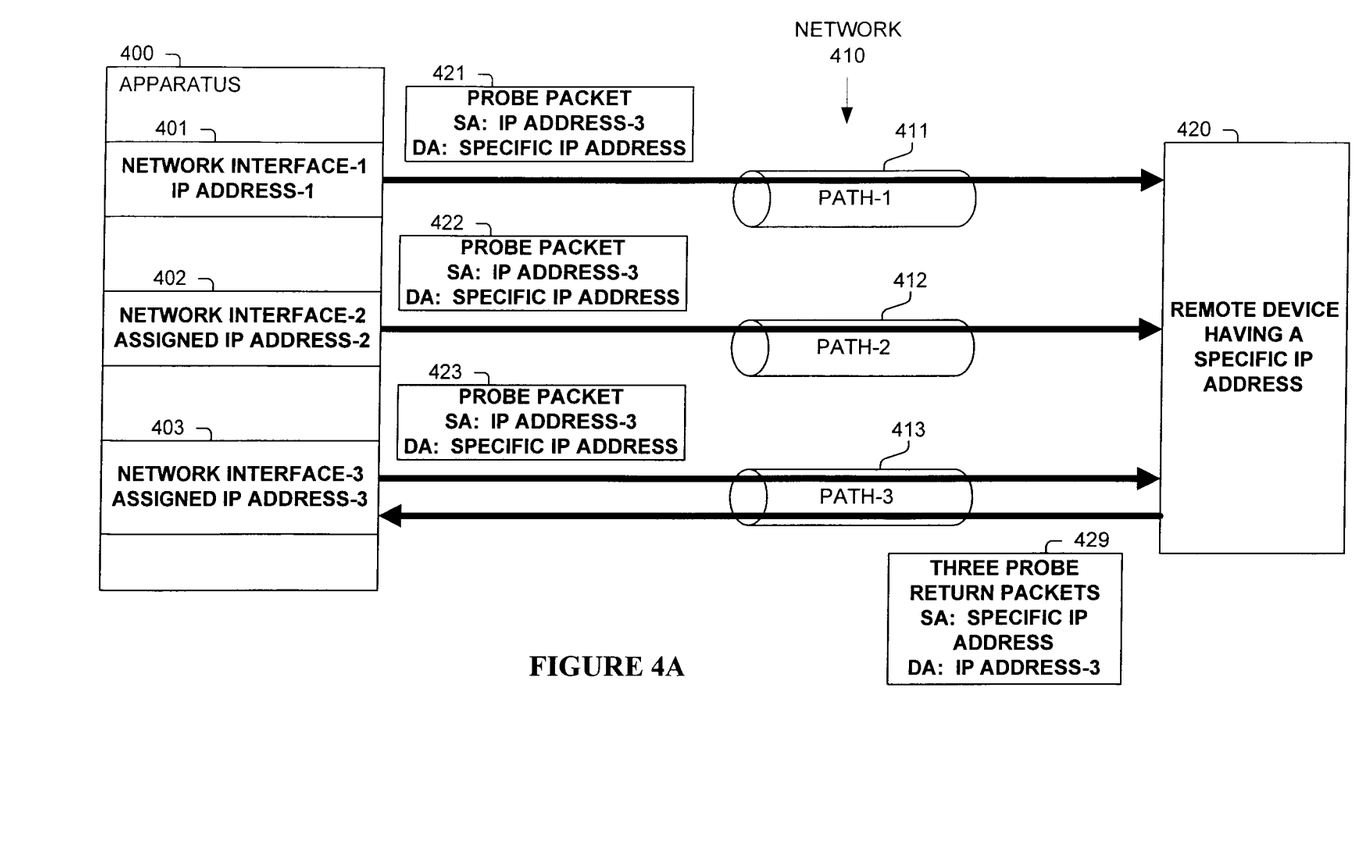
FIG. 4A illustrates an example configuration operating according to one embodiment.

FIG. 4A illustrates an example configuration operating according to one embodiment. Note, for explanation purposes, FIGS. 4A, 4B, 5A and 5B illustrate a networked device having three interfaces with a network having three different paths between the networked device and a remote device. Of course, the teachings herein are applicable to configurations having a plurality (i.e., two or more) of interfaces on a networked device with a plurality (i.e., two or more) of paths through the network.

Shown in FIG. 4A is an apparatus/networked device 400 including interfaces 401-403, each having a different IP address assigned to it. A probe packet 421-423 is sent from each of interfaces 401-403 as shown. Each of these sent probe packets 421-423 have a same source IP address, in this example that being IP address-3, and a same destination IP address of remote device 420. Each probe packet traverses a different path 411-413 through network 410 and is received by remote device 420. In response to each received probe packet (421-423), remote device 420 sends a probe return packet (429) addressed to the source IP address of the received probe packet. As each probe packet 421-423 uses IP address-3, each of the probe return packets 429 are sent from remote device 420 to network interface-3 (403) of apparatus 400 over a same path (e.g., path 413 as illustrated in FIG. 4A). By measuring the round-trip time of the probe/probe-return packet pairs, apparatus 400 can determine the relative one-way path delays as each probe packet (421, 422, 423) took a different path (411, 412, 413) to remote device 420 and each probe return packet (429) took the same path (413) from remote device 420. In other words, the difference in round-trip time of the probe/probe-return packet pairs is considered to be due to the different one-way delays in paths (411, 412, 413) from apparatus 400 to remote device 420.

Figure 4B:
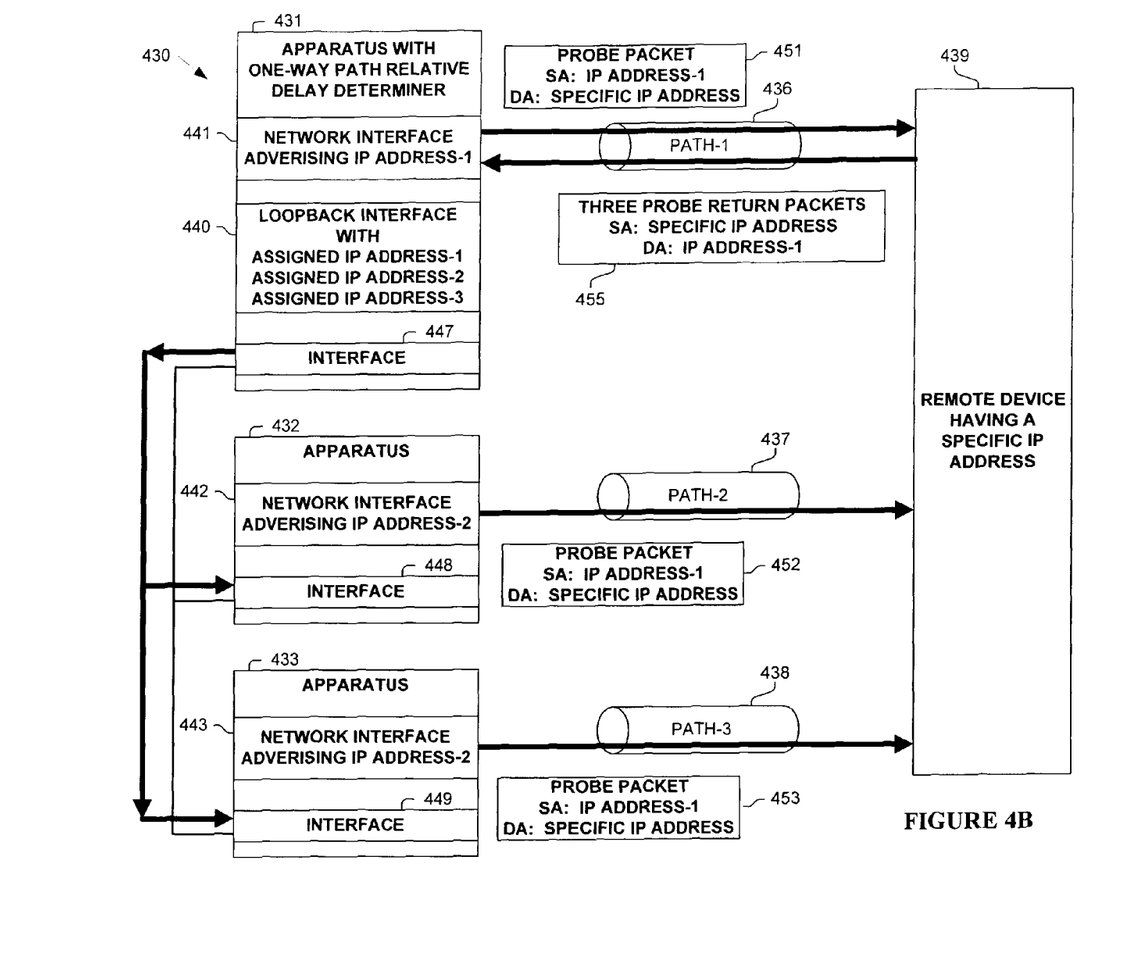
FIG. 4B illustrates an example configuration operating according to one embodiment.

Shown in FIG. 4B is a networked apparatus 430 including three networked apparatus/devices 431, 432 and 433, including interfaces 441, 442, and 443. Networked device 431 is configured to communicate with remote device 439 (having a specific IP address assigned to it over) via network interface 441 and path 436. Networked device 432 is configured to communicate with remote device 439 via network interface 442 and path 437. Networked device 433 is configured to communicate with remote device 439 via network interface 443 and path 438. Networked devices 431, 432 and 433 can also communicate among each other over interfaces 447, 448, and 449. Networked device 431 also includes a loop back interface, which is assigned three IP addresses, which are advertised only from network interfaces 441, 442, and 443 of networked devices 431, 432 and 433, respectively. Loopback interface 440 is configured such that packets being sent from networked device 431 with one of these IP addresses is automatically forwarded to the corresponding interface 441, 442, or 443 of networked devices 431, 432 or 433, respectively.

As depicted in FIG. 4B, networked device 431 sends three probe packets (451, 452, 453) to remote device 439, with each of these probe (451, 452, 453) having the same source IP address of network interface 441, and a destination IP address of remote device 439. However, by sending probe packet 452 through loopback interface's (440) interface having IP address-2 (that corresponding to interface 442 of networked device 432), probe packet 452 is communicated to networked device 432 and sent to remote device 439 from interface 442. Similarly, by sending probe packet 453 through loopback interface's (440) interface having IP address-3 (that corresponding to interface 443 of networked device 433), probe packet 453 is communicated to networked device 433 and sent to remote device 439 from interface 443. In one embodiment, probe packet 451 is sent through loopback interface 440. In one embodiment, probe packet 451 is sent directly to network interface 441, and IP address-1 is assigned to network interface 441.

In response to each received probe packet (451-453), remote device 439 sends a probe return packet (455) addressed to the source IP address of the received probe packet. As each probe packet 451-453 uses IP address-1, each of the probe return packets 455 are sent from remote device 439 to network interface-3 (441) of networked device 431 over a same path (e.g., path 436 as illustrated in FIG. 4B) through the network. By measuring the round-trip time of the probe/probe-return packet pairs, apparatus 430/networked device 431 can determine the relative one-way path delays as each probe packet (451-453) took a different path (436, 437, 438) to remote device 439 and each probe return packet (455) took the same path (436) from remote device 439. In other words, the difference in round-trip time of the probe/probe-return packet pairs is considered to be due to the different one-way delays of paths (436, 437, 439) from apparatus 403/networked device 431 to remote device 439. Note, the delay for communicating the packets among networked devices 431, 432 and 433 (and possibly other small delay) is considered negligible when compared to the time to transport packet to remote device 439 across paths 436, 437 and 438, and therefore, can be ignored for purposes of determining the relative one-way path delays.

Figure 4C:
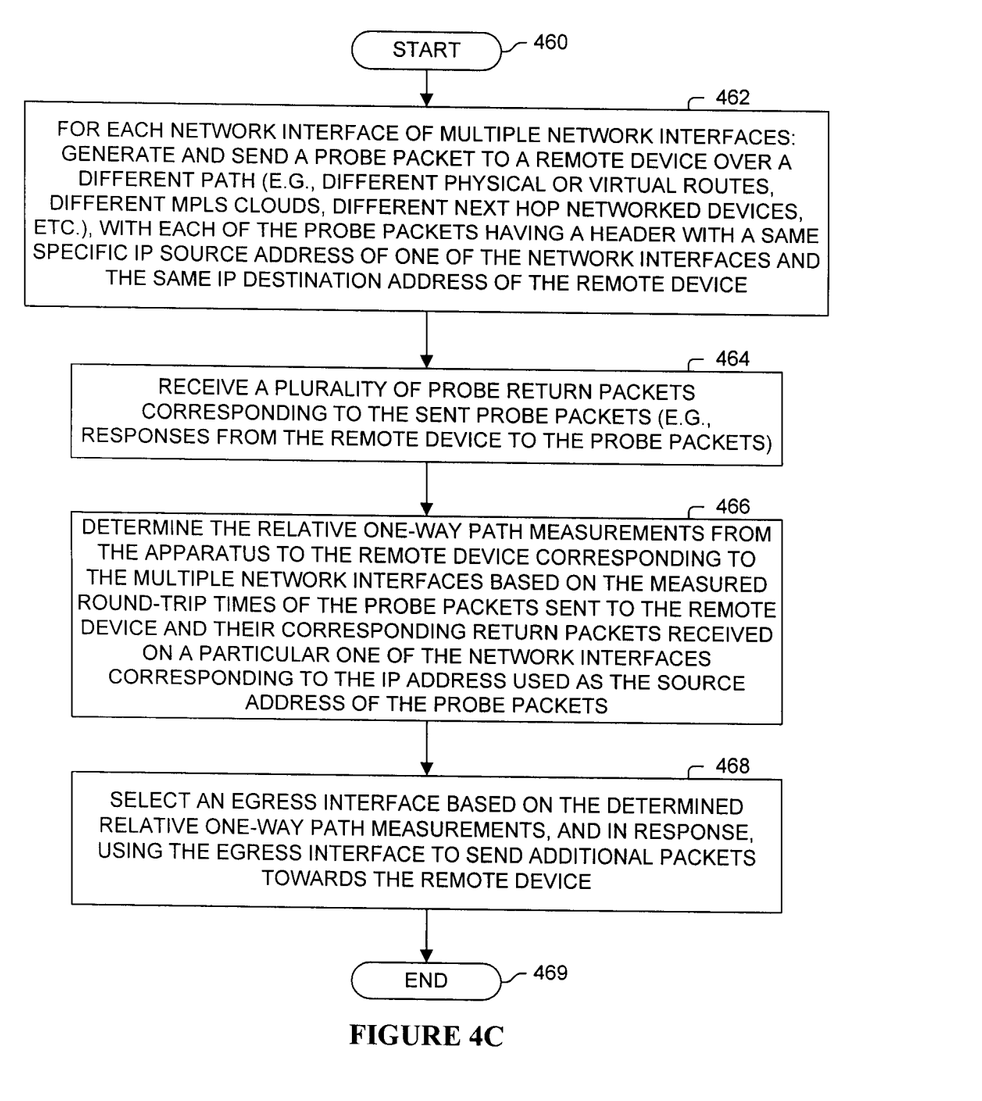
FIG. 4C illustrates a process used in one embodiment.

FIG. 4C illustrates a process used in one embodiment. Processing begins with process block 460. In process block 462, for each interface of multiple interfaces: a probe packet is generated and sent to a remote device over a different path (e.g., different physical or virtual routes, different MPLS clouds, different next hop networked devices, etc.), with each of the probe packets having a header with a same specific IP source address of one of the interfaces and the same IP destination address of the remote device. In process block 464, a plurality of probe return packets corresponding to the sent probe packets (e.g., responses from the remote device to the probe packets) are received.

In one embodiment, each of said probe packets is an Internet Control Message Protocol (ICMP) echo request, and each of said return packets is an ICMP echo reply. In one embodiment, each of said probe packets is a Transmission Control Protocol (TCP) SYN (synchronize start) packet, and each of said return packets is a TCP SYN ACK (synchronize acknowledge) or TCP RST (reset) packet. In one embodiment, another type probe/probe-return pairs is used.

Next, in process block 466, the relative one-way path measurements from the apparatus to the remote device corresponding to the plurality of network interfaces are determined based on the measured round-trip times of the probe packets sent to the remote device and their corresponding return packets received on a particular one of the interfaces corresponding to the IP address used as the source address of the probe packets.

In process block 468, an egress interface is selected based on the determined relative one-way path measurements (e.g., corresponding to the path having the least determined delay), and in response, using the egress interface to send additional packets towards the remote device. Processing of the flow diagram of FIG. 4B is complete as indicated by process block 469.

Figure 5A:
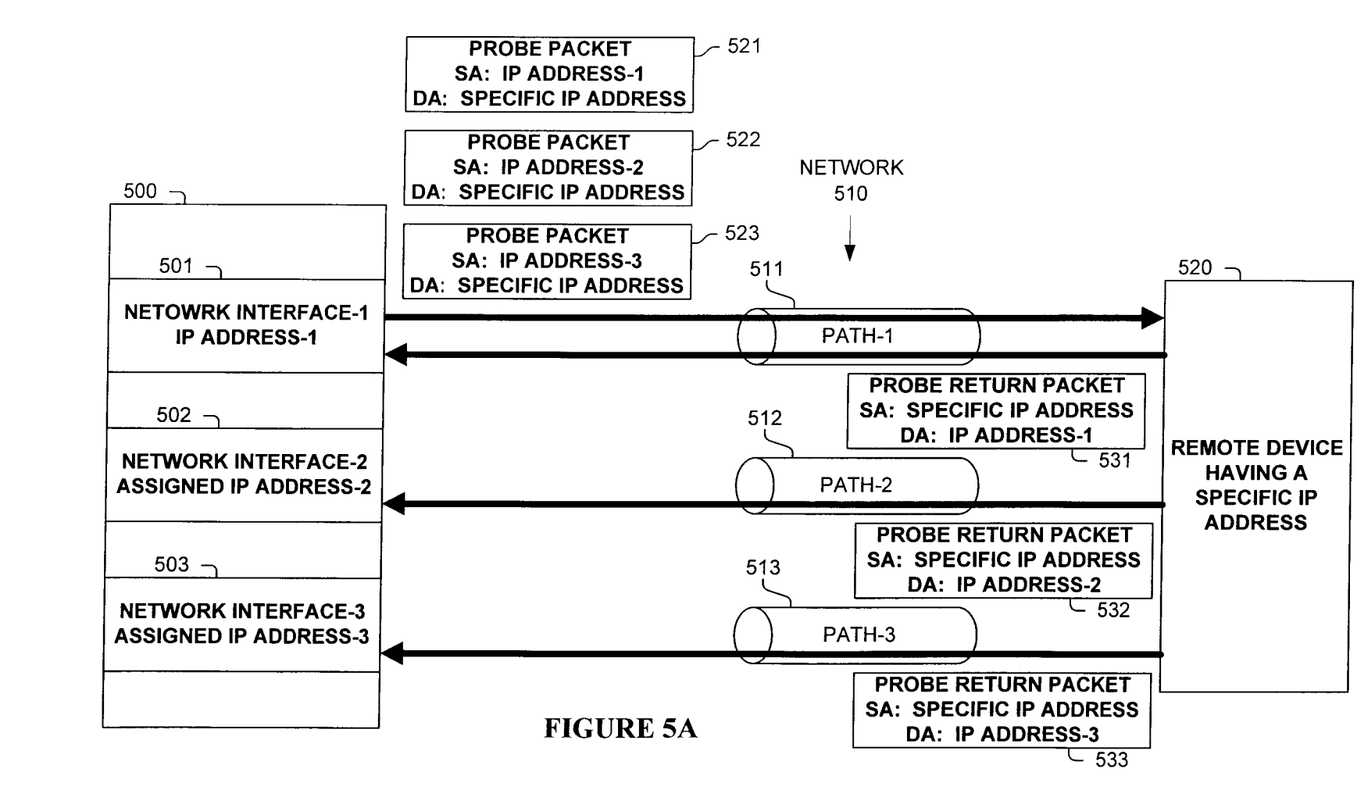
FIG. 5A illustrates an example configuration operating according to one embodiment.

FIG. 5A illustrates an example configuration operating according to one embodiment. Shown in FIG. 5A is an apparatus/networked device 500 including interfaces 501-503, each having a different IP address assigned to it. Probe packets 521-523 are sent from a single interface 501 of interfaces 501-503, with each of these probe packets 521-523 having a source IP address of a different one of interfaces 501-503, and a same destination IP address of remote device 520. Each probe packet traverses a same path 511 through network 510 and is received by remote device 520. In response to each received probe packet, remote device 520 sends a probe return packet (531-533) addressed to the source IP address of the received probe packet (521-523). As each probe packet 521-523 uses a source IP addresses corresponding to different interface 501-503, each of the probe return packets (531-533) are sent from remote device 520 apparatus 500 over a different path 511-513. By measuring the round-trip time of the probe/probe-return packet pairs, apparatus 500 can determine the relative one-way path delays as each packet took a same path (511) to remote device 520 and took a different path (511-513) from remote device 520. In other words, the difference in round-trip time of the probe/probe-return packet pairs is considered to be due to the different one-way path delays from remote device 520 to apparatus 500.

Figure 5B:
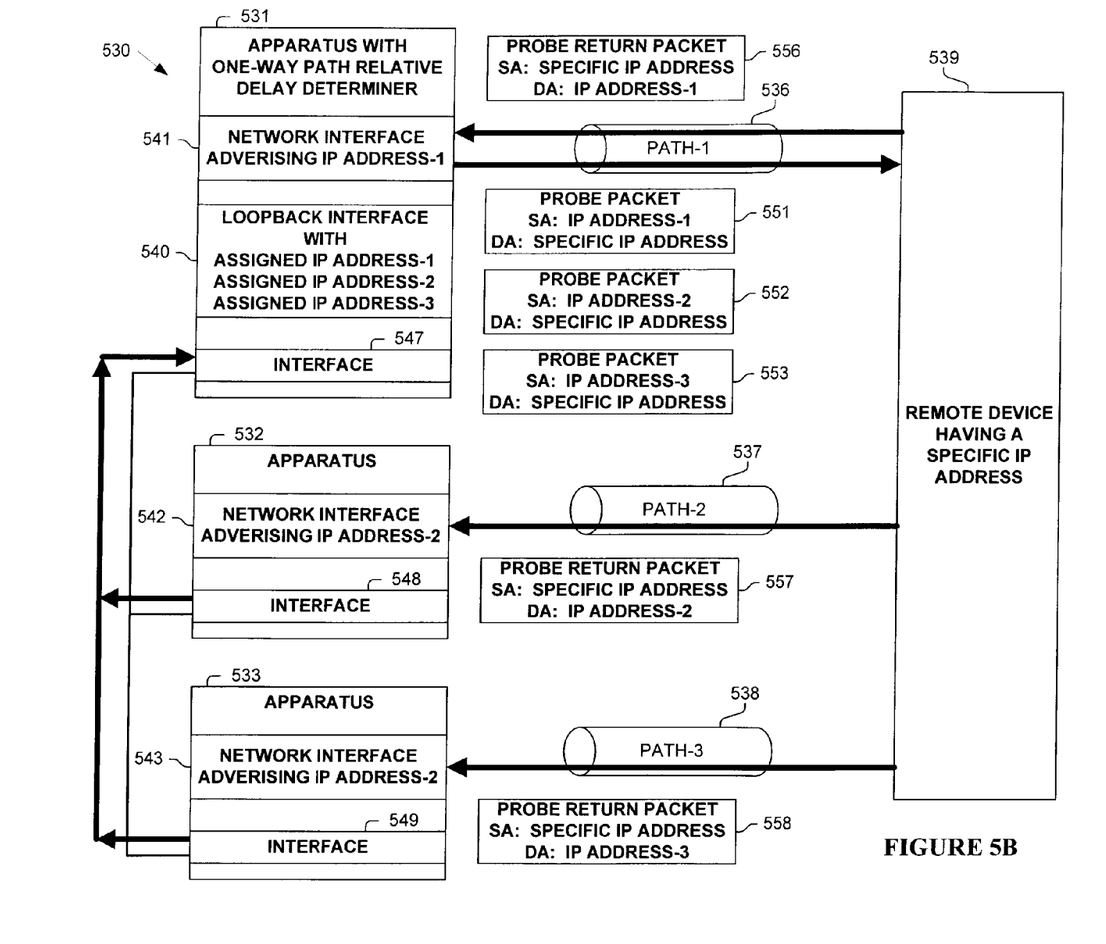
FIG. 5B illustrates an example configuration operating according to one embodiment.

Shown in FIG. 5B is a networked apparatus 530 including three networked apparatus/devices 531, 532 and 533, including interfaces 541, 542, and 542, respectively. Networked device 531 is configured to communicate with remote device 539 (having a specific IP address assigned to it over) via network interface 541 and path 536. Networked device 532 is configured to communicate with remote device 539 via network interface 542 and path 537. Networked device 533 is configured to communicate with remote device 539 via network interface 553 and path 538. Networked devices 531, 532 and 533 can also communicate among each other over interfaces 547, 548, and 549. Networked device 531 also includes a loop back interface, which is assigned three IP addresses, which are advertised only from network interfaces 541, 542, and 543 of networked devices 531, 532 and 533, respectively. In this manner, a packet received with one of these IP addresses received on one of network interfaces 541, 542, 553 of networked devices 531, 532, 533 is forwarded to loopback interface 540.

As depicted in FIG. 5B, networked device 531 sends three probe packets (551, 552, 553) from network interface 541 to remote device 539, with each of these probe (551, 552, 553) having a destination IP address of remote device 539, and a source IP address of a different one of the IP addresses assigned to loopback interface 540. Each probe packet traverses a same path 536 through the network and is received by remote device 539. In response to each received probe packet, remote device 539 sends a probe return packet (531-533) addressed to the source IP address of the received probe packet (551-553). As each probe packet 551-553 has a source IP addresses which is only advertised by a different interface 541-543, each of the probe return packets (556, 557, 558) are sent from remote device 559 to apparatus 530 over a different path 536-538. By measuring the round-trip time of the probe/probe-return packet pairs, apparatus 530 can determine the relative one-way path delays as each packet took a same path (536) to remote device 539 and took a different path (536-538) from remote device 539. In other words, the difference in round-trip time of the probe/probe-return packet pairs is considered to be due to the different one-way path delays from remote device 539 to apparatus 530/networked device 531.

Figure 5C:
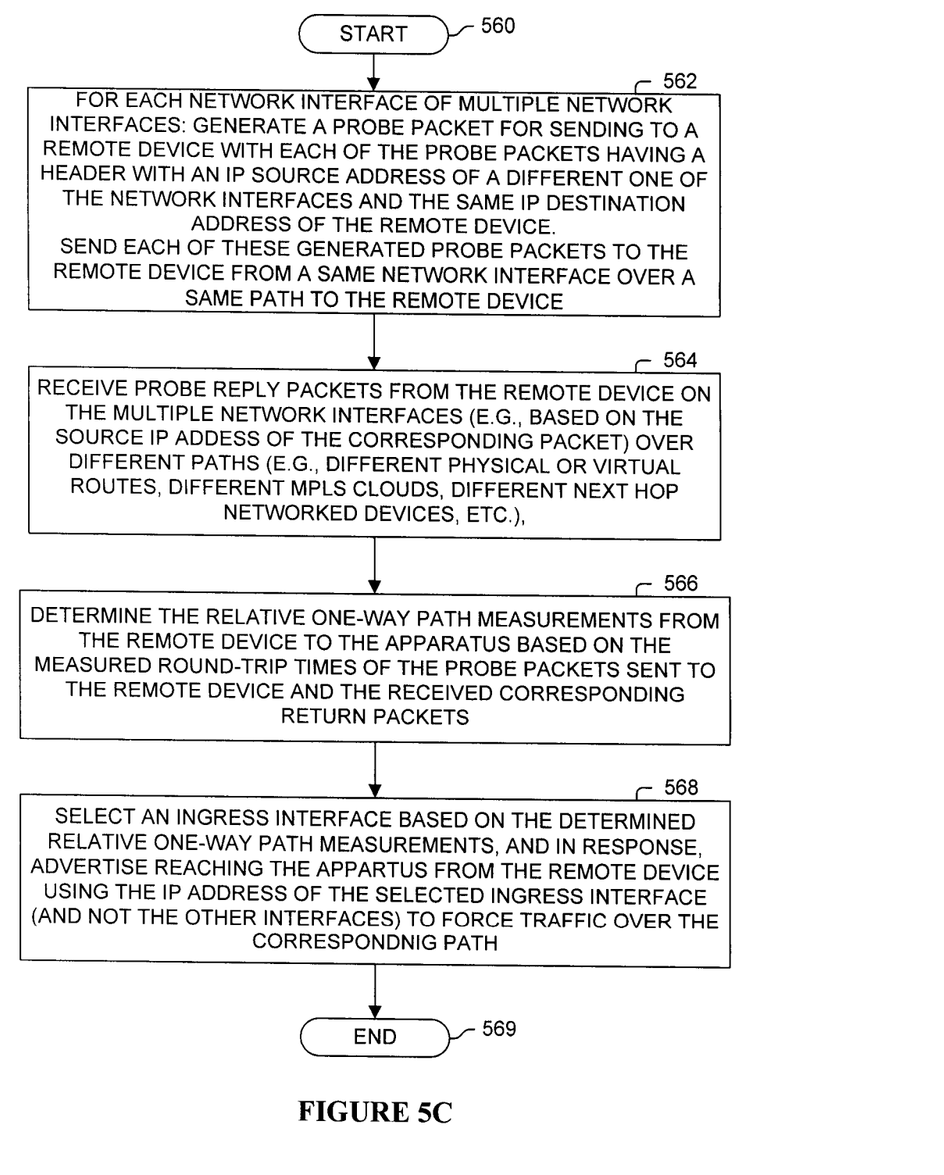
FIG. 5C illustrates a process used in one embodiment.

FIG. 5C illustrates a process used in one embodiment. Processing begins with process block 560. In process block 562, for each interface of multiple interfaces: a probe packet is generated and sent to a remote device over a same path with each of the probe packets having a header with a different IP source address of one of the interfaces, and the same IP destination address of the remote device. In process block 564, a plurality of probe return packets corresponding to the sent probe packets (e.g., responses from the remote device to the probe packets) are received.

In one embodiment, each of said probe packets is an Internet Control Message Protocol (ICMP) echo request, and each of said return packets is an ICMP echo reply. In one embodiment, each of said probe packets is a Transmission Control Protocol (TCP) SYN (synchronize start) packet, and each of said return packets is a TCP SYN ACK (synchronize acknowledge) or TCP RST (reset) packet. In one embodiment, another type probe/probe-return pairs is used.

Next, in process block 566, the relative one-way path measurements from the remote device to the apparatus corresponding to the plurality of network interfaces are determined based on the measured round-trip times of the probe packets sent to the remote device and their corresponding return packets received on the interfaces corresponding to the IP addresses used as the source addresses of the probe packets.

In process block 568, an ingress interface is selected based on the determined relative one-way path measurements (e.g., corresponding to the path having the least determined delay), and in response, the ingress interface is advertised for reaching the apparatus from the remote device such that additional packets will use the path corresponding to the selected interface. Processing of the flow diagram of FIG. 5B is complete as indicated by process block 569.

Figure 6:
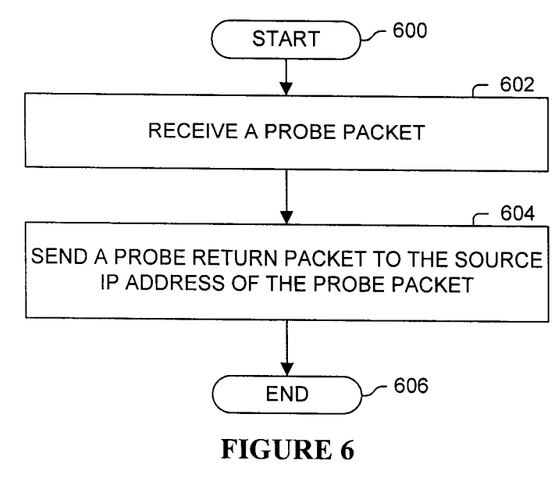
FIG. 6 illustrates a process used in one embodiment.

FIG. 6 illustrates a process used in one embodiment. Processing begins with process block 600. In process block 602, a probe packet is received. In process block 604, a probe return packet is sent based on the received source IP address of the received packet. In one embodiment, each of said probe packets is an Internet Control Message Protocol (ICMP) echo request, and each of said return packets is an ICMP echo reply. In one embodiment, each of said probe packets is a Transmission Control Protocol (TCP) SYN (synchronize start) packet, and each of said return packets is a TCP SYN ACK (synchronize acknowledge) or TCP RST (reset) packet. In one embodiment, another type probe/probe-return pairs is used. Processing of the flow diagram of FIG. 6 is complete as indicated by process block 606.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A single network device, comprising:
a plurality of network interfaces for coupling with one or more networks for communicating packets with a remote device, wherein each of the plurality of network interfaces has assigned to it a different network address; and
a one-way path delay measurer configured to cause a plurality of probe packets to be sent from the single network device to the remote device for causing a corresponding plurality of return packets to be received by the single network device; wherein said configuration includes to generate the plurality of probe packets, with each of the plurality of probe packets including a different source address corresponding to said different network address of a different network interface of the plurality of network interfaces, and including a same destination address of the remote device in order to cause each of the plurality of probe packets to traverse a same path from a single interface of the plurality of network interfaces from which each of the plurality of probe packets is to be sent to the remote device, and to cause each of the corresponding plurality of return packets to traverse a different path through said one or more networks and arriving on a different particular network interface of the plurality of network interfaces, with said different particular network interface corresponding to the different source address of said corresponding probe packet of the plurality of probe packets; wherein the one-way path delay measurer is configured to determine the relative one-way path measurements from the remote device to the single network device based on the round-trip times of said probe packets sent to the remote device and their corresponding return packets.

2. The single network device of claim 1, wherein each said different network address is an Internet Protocol (IP) address; and wherein the same destination address of the remote device is an IP address.

3. The single network device of claim 2, wherein each of said probe packets is an Internet Control Message Protocol (ICMP) echo request, and each of said return packets is an ICMP echo reply; or wherein each of said probe packets is a Transmission Control Protocol (TCP) SYN (synchronize start) packet, and each of said return packets is a TCP SYN ACK (synchronize acknowledge) or TCP RST (reset) packet.

4. A method, comprising:
performing operations by a single network device; wherein the single network device includes a plurality of network interfaces, with each of the plurality of network interfaces assigned a different network address; wherein the plurality of network interfaces includes a specific network interface; and wherein said operations include:
sending a plurality of ingress measurement probe packets out the specific network interface for transportation across one or more networks to a remote device, wherein each of said sent ingress measurement probe packets includes a header comprising a source address and a destination address, wherein the source address of each said sent ingress measurement probe packet is a different one of said different network addresses, and wherein the destination address of each said sent ingress measurement probe packet is a same network address of the remote device;
receiving on each particular interface of the plurality of network interfaces a return ingress measurement packet corresponding to one of said sent ingress measurement probe packets and having a destination address of said particular interface; and
determining the relative one-way path measurements from the remote device to the networked device corresponding to the plurality of network interfaces based on the round-trip times of said sent ingress measurement probe packets and their corresponding received return ingress measurement packet.

5. The method of claim 4, comprising selecting one of the plurality of network interfaces based on said determined relative one-way path measurements from the remote device to the single network device, and in response, advertising only said different address of said selected interface of said different addresses for reaching the single network device from the remote device.

6. The single network device of claim 1, wherein said different paths through said one or more networks from the remote device to the single network device of said corresponding plurality of return packets are non-overlapping.

7. The single network device of claim 1, wherein the single network device is configured to select one of the plurality of network interfaces based on said determined relative one-way path measurements from the remote device to the single network device, and in response, to advertise only said different address of said selected interface of said different addresses for reaching the single network device from the remote device.

8. The method of claim 4, wherein each said different network address is an Internet Protocol (IP) address; and wherein the same network address of the remote device is an IP address.

9. The method of claim 8, wherein each of said probe packets is an Internet Control Message Protocol (ICMP) echo request, and each of said return packets is an ICMP echo reply; or wherein each of said probe packets is a Transmission Control Protocol (TCP) SYN (synchronize start) packet, and each of said return packets is a TCP SYN ACK (synchronize acknowledge) or TCP RST (reset) packet.

10. The method of claim 4, wherein said different paths through said one or more networks from the remote device to the single network device of said corresponding plurality of return packets are non-overlapping.

\* \* \* \* \*